Oct. 25, 1938.    A. V. SPINOSA    2,134,155
HOLLOW PARTITION
Filed Feb. 4, 1937    2 Sheets-Sheet 1
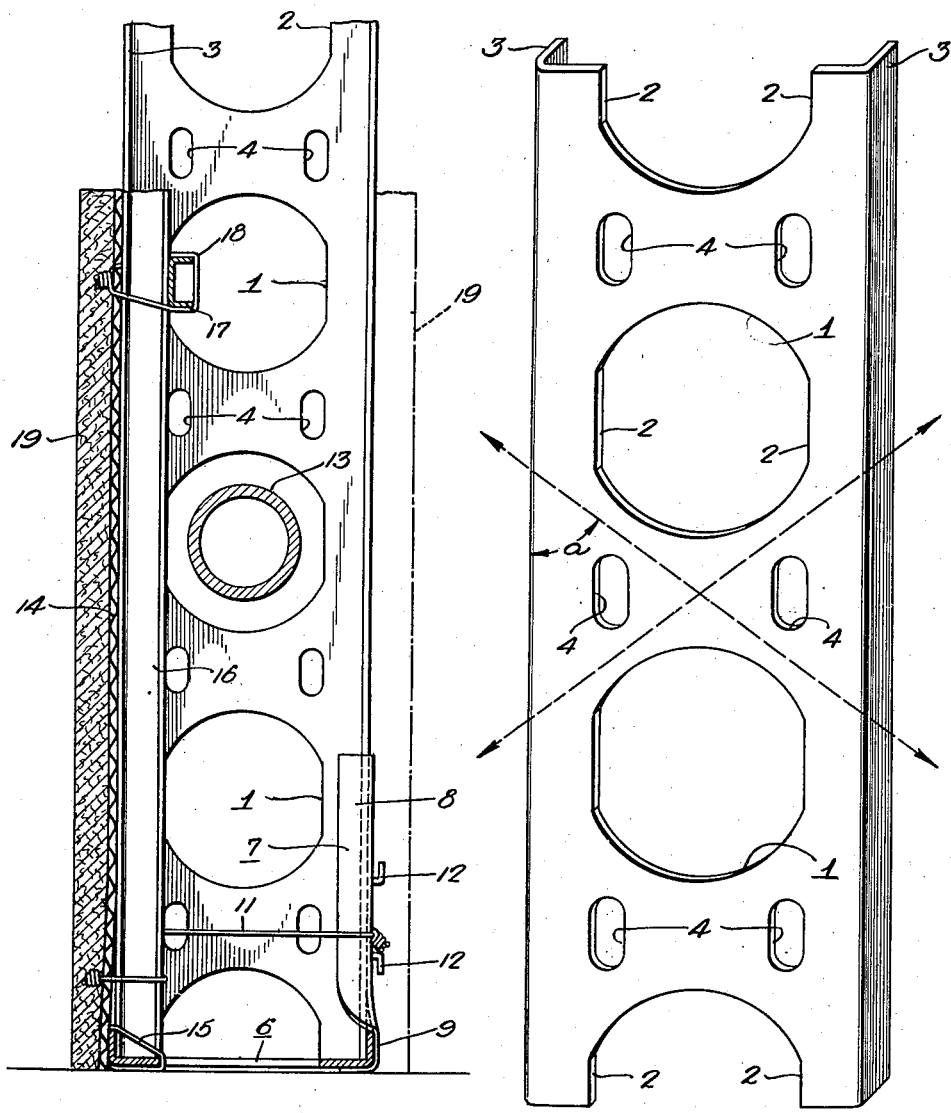

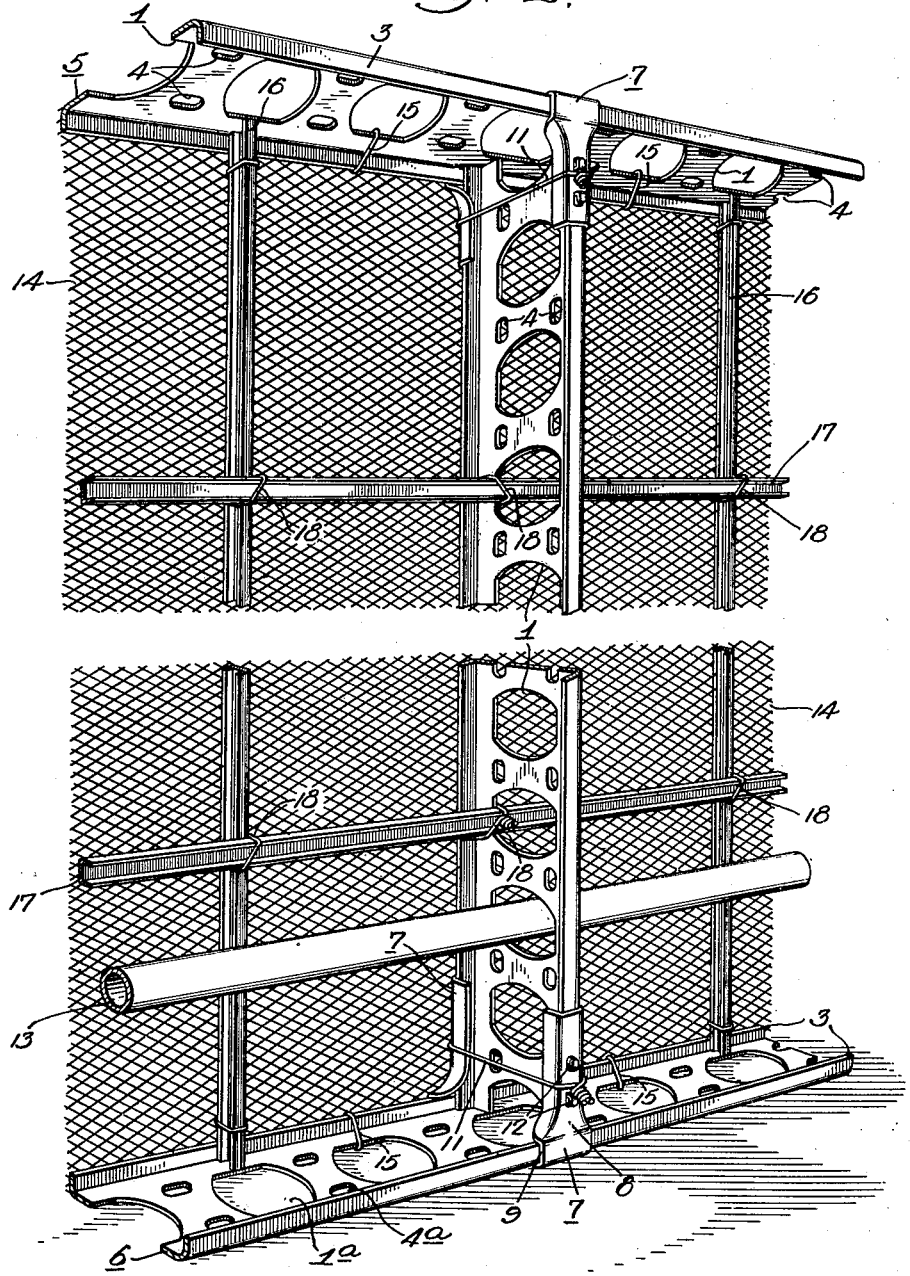

Patented Oct. 25, 1938

2,134,155

UNITED STATES PATENT OFFICE 2,134,155

HOLLOW PARTITION

Arthur V. Spinosa, Parkersburg, W. Va., assignor to Penn Metal Company, Inc., Parkersburg, W. Va., a corporation of Delaware Application February 4, 1937, Serial No. 124,112

7 Claims. (Cl. 72—46)

This invention relates to hollow partitions, and one object of the invention is to provide a perforated metal stud of generally improved structural form and characteristics adapted for use in the construction of such partitions.

Another object of the invention is to provide a perforated stud that may be combined efficiently with standard metal channel bars in the production of hollow partitions having relatively large amounts of unobstructed space for accommodation of pipes and conduits.

Still another object of the invention is to provide a novel and improved structural framework for hollow partitions.

In the attached drawings:

Figure 1 is a view in perspective of a longitudinal section of perforated stud made in accordance with my invention;

Fig. 2 is a view in perspective of a hollow partition framework also made in accordance with my invention and utilizing the perforated stud shown in Fig. 1, and Fig. 3 is a transverse sectional view through the lower portion of the partition framework illustrated in Fig. 2.

As shown in Fig. 1, a stud made in accordance with my invention has the conventional channel form. Studs of this type are usually made in widths of from 2" to 6" and in lengths corresponding to the required height of the partition. Departing from the usual practice, I provide the web of the channel with a series of approximately elliptical openings 1 which preferably are uniformly spaced longitudinally of the stud. The openings 1 are so dimensioned transversely of the stud that the distance between each side edge 2 of the opening and the outer surface 3 of the adjoining flange of the channel is equal to ¾". The purpose of this particular dimension will be set forth hereinafter. The openings 1 are preferably so relatively spaced that in a stud, say of 4", the uncut portions of the web of the channel between the openings 1 at the narrowest points are approximately 1¼", this dimension also being of importance as hereinafter set forth. Intermediate each of the openings 1 and in line with the outer side edges of the latter respectively, I provide elliptical openings 4, 4, these openings being relatively narrow transversely of the stud as illustrated. The openings 4, 4 are located midway between the adjoining openings 1, and the function of these openings will be described hereinafter. The openings 1 and 4 in the relative arrangement described produce a truss formation, as indicated by the broken lines in Fig. 1, the intersecting truss legs extending from one unperforated side edge of the strut to the other. This balanced symmetrical truss formation adds materially to the strength and load-carrying capacity of the stud, and the perforations reduce the weight of the stud to a practical minimum.

It will be apparent that in this construction, the spacing of the openings 1 is not critical and may exceed the 1¼" dimension given above. Increasing this dimension, however, necessarily reduces the number of said openings in any given length of stud and correspondingly increases the weight; and any material reduction of the dimension correspondingly reduces the strut effect and tends to negative the obvious advantages accruing thereto. The stated spacing of 1¼" has been determined as affording in a stud of average width, namely 4", a maximum of structural strength combined with a minimum of weight. It will be noted that with this arrangement the angle $a$ between the legs of the truss and the longitudinal edge of the strut is approximately 55°, and for maximum efficiency this angle should not be materially decreased. Also, by making the openings 1 approximately equal in the longitudinal dimension to the maximum effective height of the truss, the combined reinforcing effect of the trusses is substantially uniformly distributed over the entire length of the strut. Obviously, the actual dimensions are subject to modification in order to maintain these favorable conditions in struts of greater or lesser width.

In the construction of a partition employing a stud of this form, and as shown in Fig. 2, I employ the usual upper and lower horizontal track channels 5 and 6, which respectively occupy positions at the ceiling and floor and which may be of the same construction as the stud but which are made sufficiently wider than the stud so that the ends of the latter may fit neatly between the side flanges of the track channels. The vertical studs may be secured to the track members by means of shoes 7, said shoes having a longitudinal channel portion 8 embracing the side edges or flanges of the stud and being bent at one end to form a transverse channel 9 embracing the side flange of the track member as illustrated. These shoes 7 are held in place in the present instance by wire clips 11 which extend around the stud and embrace the channel portions 8 of the shoes, and the latter portions of the shoes are in the present instance provided with pressed-out lugs 12, 12 which function in positive manner to retain the clips in position. In the normal partition structure, the studs may be placed apart longitudinally of the partition to any extent desired, say for example 24". With this construction it will be apparent that the openings 1 in the studs, which necessarily are in substantial alignment, provide ample space for passage transversely through the partition of pipes or ducts, as illustrated for example at 13 in Figs. 2 and 3.

The strips of metal lath 14 which constitute the plaster base and to which the plaster coating, shown at 19 in Fig. 3, is applied are secured to the opposite faces of the framework by means of wire clips 15, these clips extending through the openings 1 and through the interstices of the lath, and in the present case, the apertures 4 offer additional means for attaching the clips at convenient points.

It frequently happens that in a hollow partition of this character, the number or arrangement of the pipes or ducts required to pass through the partition is such that considerable difficulty is experienced in passing them through the studs and in accommodating them in the spaces between the latter. My invention contemplates, for the purpose of affording additional space in the interior of the partition under such conditions, the use with studs of the formation described above of standard channel bars of the type commonly used in the construction of solid partitions. With studs made in accordance with my invention, these bars 16, which conventionally are ¾" in width, may be installed as shown in Figs. 2 and 3 in vertical positions at each side of the partition, the extremities of the channels fitting within the tracks and seating neatly upon the uncut portions of the web between the side flanges of the channels and the adjoining sides of the openings 1a and 4a. Since the distance between the side edges of the openings 1 and the outer face of the adjoining flange of the studs is ¾", as described above, the outer vertical edges of the upright channels 16 will be aligned with the outer vertical edges of the studs, and the inner vertical edges of the upright channels 16 will be similarly aligned with the sides of the openings 1. Under these conditions, transverse channel bars 17, passed through the apertures 1 of the studs, will lie flush against the inner vertical sides of the upright channels 16 and against the side edges of the stud apertures, and may be secured in this position both to the channels and to the studs by means of wire clips 18. In assembly, the metal lath is clipped to the studs in the usual manner and also to the upright and transverse channels as illustrated. The resulting structure is sufficiently strong and rigid to meet the ordinary requirements for a partition of this general character, and has the advantage that the perforated studs may be placed as far apart as may be necessary to afford the required unobstructed space in the interior of the partition.

I claim:

1. A hollow partition comprising a stud of channel form having in the web thereof a longitudinal series of openings, said openings affording at each longitudinal side edge of the channel an uncut web strip approximately ¾" in width, a channel in parallel spaced relation to said stud, said channel being in alignment with said uncut web strip and having a width approximately the same as said strip, and a transverse channel extending through one of said stud openings and being secured against a lateral edge of said opening and against the inner side of said channel, said transverse channel lying substantially parallel to a plane extending through the adjoining side edge of said stud and the outer edge of the said channel.

2. A hollow partition comprising a stud of channel form having an opening in the web thereof, a second stud in the form of a relatively small channel arranged in parallel spaced relation and with one vertical face thereof in a plane with one side edge of said first-named stud, the transverse depth of said relatively small channel stud corresponding substantially with the distance between the said side edge of the first stud and the adjoining side of said opening, and a bar extending through said opening and being secured against the said side of the latter and against the inner face of said smaller channel stud and rigidly connecting said studs.

3. In a hollow partition, a metallic framework comprising a perforated stud corresponding in transverse dimension to the interior width of said partition, a plurality of relatively narrow studs of channel form arranged respectively at the opposite sides of said framework and having their outer faces aligned respectively with the outer side edges of said perforated stud, and a plurality of reinforcing rods extending through the perforations of said first-named stud and secured to the latter and against the inner faces of said relatively narrow studs.

4. In a hollow partition, the combination with upper and lower channel tracks, of a plurality of perforated studs having their ends seated in said tracks and extending therebetween in parallel spaced relation, a relatively narrow stud of channel form extending between said tracks intermediate said perforated studs and in substantially parallel relation with the latter, and transverse rods extending through the perforations of said first-named studs and secured to the latter studs and respectively against the inner faces of said intermediate relatively narrow stud, the outer faces of said intermediate studs lying substantially in a plane respectively with the vertical side edges of said perforated studs, and metal lathing secured against the aligned faces of said studs.

5. For hollow partitions, a stud consisting of an elongated flat web of sheet metal having at each of the parallel longitudinal edges thereof a continuous narrow transverse flange forming with said web a shallow channel, said web having therein a longitudinal series of major openings uniformly spaced and each symmetrical with respect to the longitudinal center line of the stud, said major openings being interspersed with minor openings arranged in two longitudinal series respectively at opposite sides of said center line, the edges of each of the major and minor openings which adjoin the respective longitudinal edges of the stud being rectilinear and parallel to said longitudinal edges and being longitudinally aligned with each other, thereby to provide at each longitudinal edge of the stud free edge portions of uniform width and substantial length extending in closely spaced relation over the full length of the stud and available to tie clips for securing lath elements to the edges of the stud, and the proximate edges of the major openings forming with the adjoining edges of the minor openings and between each pair of major openings a cruciform truss, the intersecting legs of which unite the said longitudinal edge portions of the stud.

6. A hollow partition comprising a stud of channel form having in the web thereof a longitudinal series of major openings and intermediate each adjoining pair of said openings two minor apertures arranged respectively toward the lateral side edges of said openings, the uncut portions of the web intermediate said openings and apertures defining a cruciform truss the intersecting legs of which join the longitudinal flanged edge portions of the stud, the edges of the major and minor openings which adjoin the respective longitudinal edges of the stud being rectilinear and parallel to said longitudinal edges and being longitudinally aligned with each other so as to provide at each of the longitudinal edges a series of closely adjoined free edge portions of uniform width and substantial individual lengths adapted to receive tie clips for securing lath elements to the edges of the stud.

7. For hollow partitions, a stud in the form of a shallow channel of sheet metal, the web of said channel exhibiting at each longitudinal side a continuous uncut strip of metal of uniform width, the inner edges of which are defined in part by rectilinear opposite side edges of a plurality of major openings forming a longitudinal series in said web and each symmetrical with respect to the longitudinal center line of the web, and in part by rectilinear outer side edges of a plurality of minor openings formed in said web in two longitudinal series at opposite sides respectively of said center line with the individual openings of each series interspersing the said major openings, the proximate edges of each adjoining pair of major openings forming with the intermediate minor openings a cruciform truss of metal in the web uniting the said uncut strips of the latter.

ARTHUR V. SPINOSA.